United States Patent [19]

Farrell et al.

[11] Patent Number: 4,810,232

[45] Date of Patent: Mar. 7, 1989

[54] TELESCOPIC TRIPOT UNIVERSAL JOINT

[75] Inventors: Robert C. Farrell, Frankenmuth; David J. McGregor, Saginaw, both of Mich.

[73] Assignee: General Motors Corporation, Detroit, Mich.

[21] Appl. No.: 186,701

[22] Filed: Apr. 20, 1988

Related U.S. Application Data

[63] Continuation of Ser. No. 7,707, Jan. 28, 1987, abandoned.

[51] Int. Cl.$^4$ .............................................. F16D 3/20
[52] U.S. Cl. .................................. 464/111; 464/123; 464/132; 464/905
[58] Field of Search ............... 464/111, 120, 122, 123, 464/124, 132, 905

[56] References Cited

U.S. PATENT DOCUMENTS

| | | | |
|---|---|---|---|
| 1,863,244 | 6/1932 | Goddard | 464/124 |
| 2,125,615 | 8/1938 | Kittredge | |
| 2,910,845 | 11/1959 | Wahlmark | |
| 3,818,721 | 6/1974 | Wahlmark | 464/111 |
| 4,192,154 | 3/1980 | Nakamura et al. | 464/111 |
| 4,224,806 | 9/1980 | Kobayashi | 464/111 |
| 4,319,467 | 3/1982 | Hegler et al. | 464/111 X |
| 4,379,706 | 4/1983 | Otsuka et al. | 464/111 |
| 4,484,900 | 11/1984 | Orain | 464/111 |

FOREIGN PATENT DOCUMENTS

| | | | |
|---|---|---|---|
| 57-6131 | 1/1982 | Japan | 464/111 |
| 2070195 | 9/1981 | United Kingdom | |
| 2099549 | 12/1982 | United Kingdom | |
| 2106219 | 4/1983 | United Kingdom | 464/111 |

Primary Examiner—Daniel P. Stodola
Attorney, Agent, or Firm—F. J. Fodale

[57] ABSTRACT

A telescopic tripot universal joint comprises an outer drive member having three radial drive channels which include two flat longitudinal drive tracks, an inner drive member having three radial trunnions having cylindrical bearing surfaces, and three intermediate drive rollers disposed in the respective radial drive channels and rotatably and slideably mounted on the respective radial trunnions. Each intermediate drive roller has a radial bore which is convexly shaped so as to permit a slight universally pivoting or wobbling movement of the intermediate drive roller on the radial trunnions and the radial trunnions have stops for limiting outward movement of the drive rollers during operation of the telescopic tripot universal joint. A full complement of cylindrical needle rollers is disposed between the convexly shaped radial bore of each intermediate drive roller and the cylindrical bearing surface of the respective trunnion.

14 Claims, 2 Drawing Sheets

TELESCOPIC TRIPOT UNIVERSAL JOINT

This patent application is a continuation of prior U.S. patent application Ser. No. 007,707, filed on Jan. 28, 1987, now abandoned.

BACKGROUND OF THE INVENTION

This invention relates generally to telescopic universal joints and more particularly to tripot type universal joints employed in automotive vehicle axle driveshafts and especially in front-wheel drive vehicles between the transaxle differential and the driving wheel. A telescopic constant velocity joint should not only transmit the torque at various speeds, angles and telescopic positions, but also prevent any vibrations of the engine from being transmitted through the joint and driveshaft to the driving wheel and the vehicle structure. In addition, when the universal joint operates at an angle, it should not produce any oscillating axial excitation which may be capable of initiating vibrations in the driveshaft or in the structure of the vehicle.

U.S. Pat. No. 3,125,870 granted to Michael Orain, Mar. 24, 1964, discloses a conventional telescopic tripot type universal joint of the prior art. These universal joints have been one of the best telescopic type universal joints available for isolating engine vibrations from the rest of the vehicle. However, because of their frictional operating characteristics, these conventional prior art tripot universal joints produce internally generated oscillating axial forces, which are related to the transmitted torque and the joint angle. During severe accelerations at low vehicle speeds, these cyclic axial forces can be of sufficient magnitude to produce a "shudder" type disturbance which has a frequency equal to three times the shaft speed.

The conventional tripot joint consists typically of an outer housing member with three equally spaced longitudinal drive channels driveably connected to an inner drive spider member through three trunnion mounted drive rollers which are capable of rotatable and slidable movement on their respective spider trunnions.

When the outer and inner drive members are aligned at zero degree joint angle and with axial stroking imposed on the joint under a torsional load, pure rolling motion occurs between the drive rollers and their corresponding drive channels. However, when such a joint is operated with the outer and inner drive members inclined to one another, the drive rollers are brought into an inclined relation with their respective drive channels so that each drive roller does not roll in the direction of its corresponding drive channel and consequently, some sliding or skidding along with rolling motion takes place between the two contacting surfaces. As the joint angle increases the amount of sliding also increases, while the amount of rolling decreases. As the joint rotates, this relative rolling-to-sliding relationship of each drive roller in its drive channel varies in an oscillating manner and produces a cyclic axial force along the rotational axis of the joint which has a frequency of three times the shaft speed.

In addition, as the joint rotates at an angle, relative endwise sliding movement of each drive roller on its corresponding spider trunnion also varies in a similar oscillating manner due to the joint's three per revolution orbiting characteristic. These effects are additive to the previously described cyclic axial force produced by the roller-to-drive channel contact relationship.

SUMMARY OF THE INVENTION

The object of this invention is to provide a telescopic tripot universal joint which substantially reduces or eliminates the overall level of the frictional effects and the resultant internally generated cyclic axial force produced by a conventional telescopic universal joint.

A feature of the invention is that the telescopic tripot universal joint has three cylindrical trunnions which are spaced substantially 120 degrees from each other around the rotational axis of the inner drive member.

Another feature of the invention is that the outer drive member or housing has three longitudinal drive channels equally spaced about its rotational axis, each of which have two flat parallel drive tracks which are on opposite sides of the drive channel.

Another feature of the invention is that three drive rollers are rotatably and slideably mounted on the three cylindrical trunnions and disposed in the three drive channels between the two flat parallel drive tracks so as to permit nutation or wobbling movement of the drive rollers during operation of the tripot universal joint.

Another feature of the invention is that each of the drive rollers has a radial bore which is convexly shaped so as to permit nutation or wobbling movement of the drive rollers on the radial trunnions during operation of the telescopic tripot universal joint.

Another feature of the invention is that the radial trunnions have stops which limit the outward movement of the drive rollers on the trunnions during operation of the telescopic tripot universal joint.

Still another feature of the invention is that the drive rollers are mounted on the radial trunnions with a full complement of cylindrical needle rollers disposed between the radial bore of each drive roller and the cylindrical bearing surface of the respective trunnion.

Still another feature of the invention is that the convexly shaped radial bore of each drive roller has a crown which is midway between the ends of the drive roller so that the radial bore flares toward each end of the drive roller.

Still yet another feature of the invention is that the convexly shaped radial bore of each intermediate drive roller has a profile which is formed by a radius of about 80 mm which produces a drop of approximately 0.20 mm from the crown at each end of the radial bore.

Other objects and features of the invention will become apparent to those skilled in the art as the disclosure is made in the following detailed description of a preferred embodiment of the invention as illustrated in the accompanying sheets of drawing in which:

DESCRIPTION OF THE PREFERRED EMBODIMENT

Figure 1:
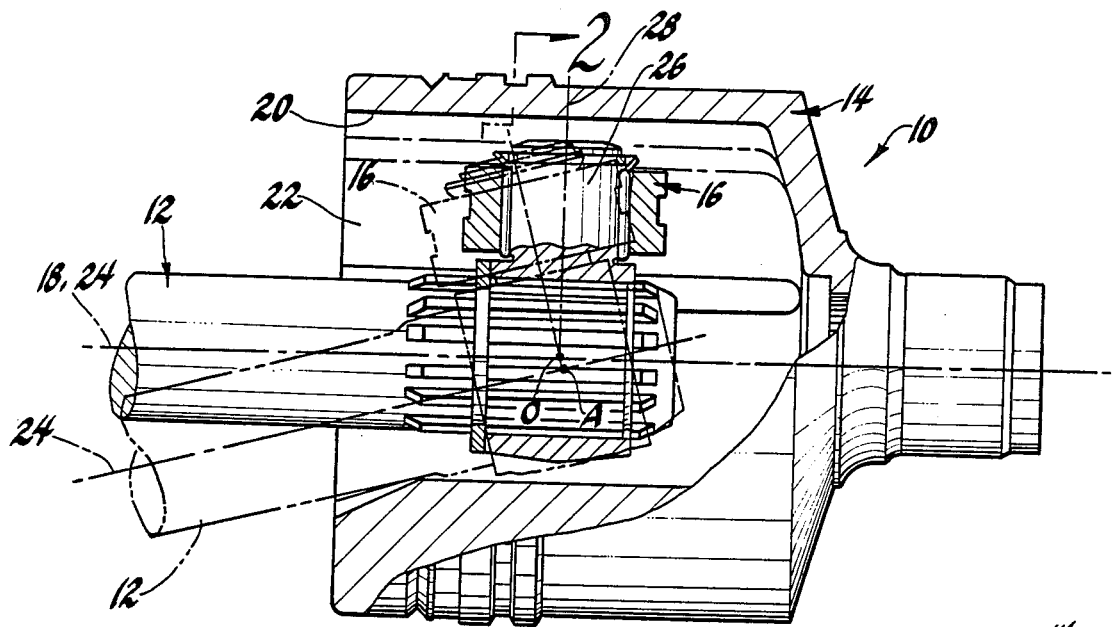
FIG. 1 is a longitudinal section of a telescopic tripot universal joint in accordance with the invention.
Figure 2:
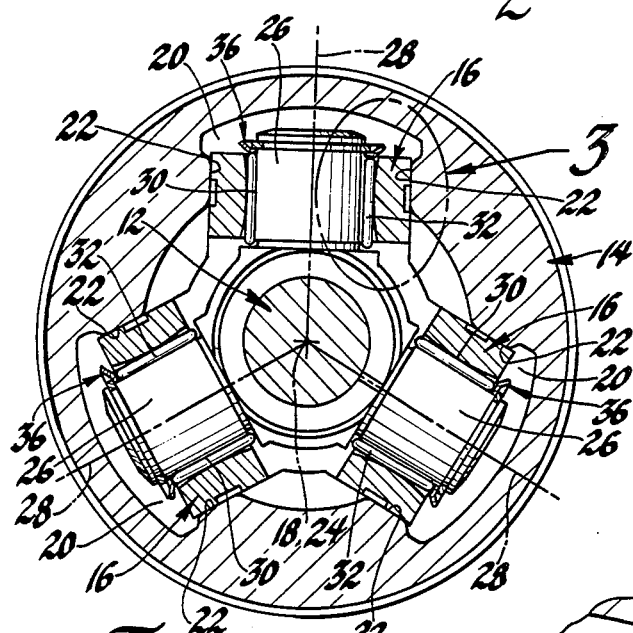
FIG. 2 is a transverse section of the telescopic tripot universal joint taken substantially along the line 2—2 of FIG. 1 looking in the direction of the arrows.
Figure 3:
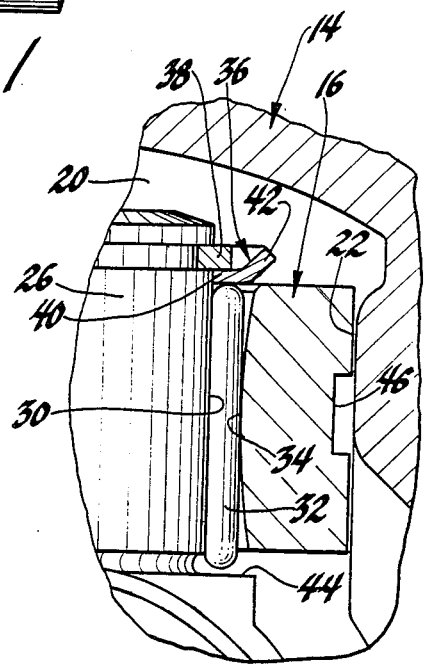
FIG. 3 is a fragmentary enlargement of FIG. 2.

Referring now to the drawing, the invention is illustrated in conjunction with a tripot universal joint 10 which comprises an inner drive member 12, an outer drive member 14 and a plurality of drive rollers 16.

The outer drive member 14 has a longitudinal axis 18 about which it rotated and three radial drive channels 20 which are equally spaced at substantially 120 degrees from each other. The longitudinal drive channels 20 may be straight, i.e. having centerlines which are parallel to the longitudinal axis 18 as shown in the drawing or helical, i.e. having centerlines which are at a small angle, such as 6 degrees, with respect to the longitudinal axis 18. In any event, each radial drive channel 20 has two flat parallel drive tracks 22 which are on opposite sides of the drive channel.

The inner drive member 12 has a longitudinal axis 24 about which it rotates. The longitudinal axes 18 and 24 coincide when the tripot universal joint 10 is at zero angel as shown in solid lines in FIG. 1 and intersect at a point on the longitudinal axis 18 which is spaced from the joint center 0 when the tripot universal joint is articulated or bent at an angle as shown in phantom lines in FIG. 1.

The inner drive member 12 has three radial trunnions 26 equally spaced at substantially 120 degrees from each other on coplanar radial axes 28 which intersect the longitudinal axis 24 perpendicularly at a spider center A. The spider center A which lies on the longitudinal axis 18 of the outer drive member 14 at zero angle is displaced radially from the longitudinal axis 18 and orbits around the joint center 0 at three times the joint speed when the tripot universal joint 10 is articulated and rotated at a given speed.

The radial trunnions 26 comprise cylindrical bearing surfaces 30 which are concentric to the radial axes 28. The drive rollers 16 are mounted on the radial trunnions 26 with a full complement of needle rollers 32 disposed between the radial bore 34 of each drive roller 16 and the cylindrical bearing surface 30 of the respective trunnion 26.

The radial bore 34 of each drive roller 16 is convexly shaped. The crown of the convexly shaped radial bore 34 is midway between the ends of the drive roller 16 and consequently the bore 34 flares toward each end of the drive roller 16. This profile of the radial bore 34 is of sufficient convexity to permit a nutation or wobbling action of the drive roller 16 on the radial axis of the radial trunnion 26.

A suitable profile for the radial bore 34 of drive rollers 16 having a cylindrical outer diameter of about 40 mm and a radial bore of about 25.5 mm may be formed by a radius of about 80 mm which produces a drop of approximately 0.20 mm from the crown at each end of the radial bore 34 in a drive roller which is about 17 mm in height.

Of course, the specific profile of the radial bore 34 must be adjusted for size changes in the drive rollers 16. In general, the degree of convexity increases with increasing roller diameter.

A stop washer 36 is retained at the outer end of each trunnion 26 by a snap ring 38 disposed in a groove in the trunnion end. The stop washer has a flat inner portion 40 and a conical outer portion 42. The flat inner portion 40 retains the needle rollers 32 in the outward direction while an annular shoulder 44 of the inner drive member 12 at the inner end of the trunnion 26 retains the needle rollers in the inward direction. Each drive roller 16 moves radially with respect to the trunnion 26 and needle rollers 32 on which it is mounted within the limits of the annular shoulder 44 in the inward direction and the conical outer portion 42 of the stop washer 36 in the outward direction.

Figure 4:
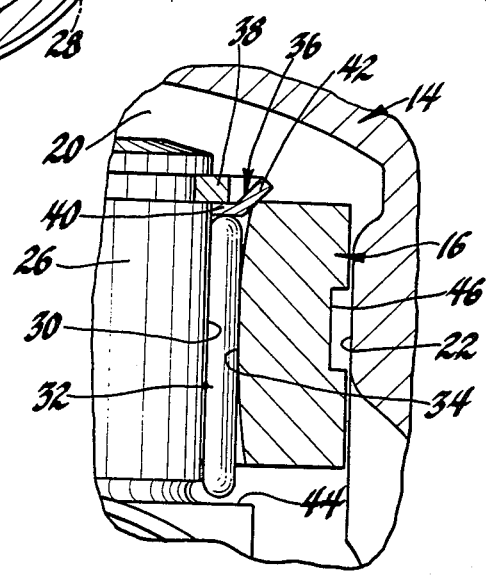
FIG. 4 is a fragmentary enlargement similar to FIG. 3.

When the tripot universal joint 10 is bent at an angle and rotated, the drive rollers 16 move outwardly against the conical outer portions 42 of the stop washers 36 as shown in FIG. 4. The drive rollers 16 move up and down and back and forth in the respective radial drive channels 20 with a nutation or wobbling motion during each revolution. This nutation or wobbling movement which is due to the convex profile of the radial bores 34 reduces the percent of sliding friction between the contacting surfaces of the drive roller and the drive channel and thus the overall frictional resistance of the tripot universal joint 10 is reduced.

Figure 5:
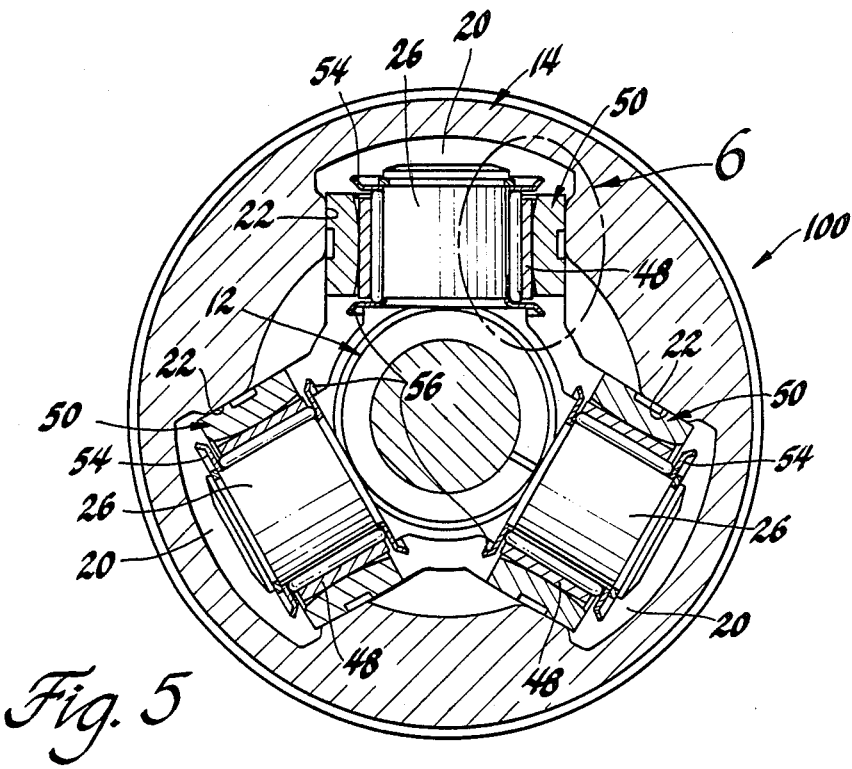
FIG. 5 is a transverse section of a modified telescopic tripot universal joint in accordance with the invention.
Figure 6:
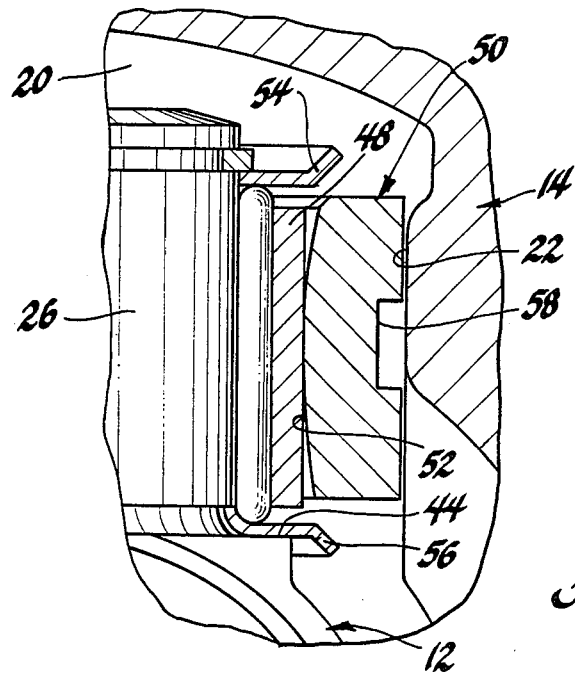
FIG. 6 is a fragmentary enlargement of FIG. 5.

Consequently, the tripot universal joint 10 of the invention reduces the overall level of frictional effects and the resultant cyclic axial force along the rotational axis of the joint which in turn reduces the "shudder" disturbance level in a front wheel drive vehicle when the joint operates at a given angle. The drive rollers 16 may also include a peripheral oil groove 46 to improve lubricant distribution. The universal joint in accordance with the invention may also include a sleeve 48 between the needle rollers 32 and an appropriately modified drive rollers 50 as shown in the modified universal joint 100 illustrated in FIGS. 5 and 6.

The drive rollers 50 are mounted on the radial trunnions 26 with the sleeve 48 and the full complement of needle rollers 32 disposed between the radial bore 52 of each drive roller 16 and the cylindrical bearing surface 30 of the respective trunnion 26.

Thus the drive rollers 50 have a thinner wall. However, the radial bore 52 of each drive roller 50 is convexly shaped as before. That is, the crown of the convexly shaped radial bore 52 is midway between the ends of the drive roller 50 and the bore 52 flares toward each end of the drive roller 50. The profile of the radial bore 52 is also of sufficient convexity to permit a nutation or wobbling action of the drive roller 50 on the radial axis of the radial trunnion 26.

A suitable profile for the radial bore 52 of drive rollers 50 having a cylindrical outer diameter of about 40 mm and a radial bore of about 30.5 mm may be formed by a radius of about 80 mm which produces a drop of approximately 0.20 mm from the crown at each end of the radial bore 34 in a drive roller which is about 17 mm in height.

Of course as before, the specific profile of the radial bore 52 must be adjusted for size changes in the drive rollers 16. In general, the degree of convexity increases with increasing roller diameter.

The modified universal joint 100 has a stop washer 54 at the outer end of the trunnion 26 which is enlarged in diameter and an inner stop washer 56 is seated on the inner drive member shoulder 44 to compensate for the larger diameter radial bore 52 of the drive roller 50. The modified universal joint 100 is otherwise the same as the universal joint 10 and the same identifying numerals have been used for common corresponding parts. The drive roller 50 may also have a peripheral oil groove 58 for improved lubricant distribution.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A telescopic tripot universal joint comprising:
   a first drive member having a first longitudinal axis and three longitudinal drive channels equally spaced at substantially 120 degrees from each other, each longitudinally drive channel including two flat parallel drive tracks which are on opposite sides of the drive channel;
   a second drive member having a second longitudinal axis and three radial trunnions equally spaced at substantially 120 degrees from each other on coplanar radial axes which intersect the second longitudinal axis at a spider center, said radial trunnions having cylindrical bearing surfaces and being disposed in the respective longitudinal drive channels of the first drive member; and
   three cylindrical drive rollers disposed in the respective longitudinal drive channels between the flat parallel drive racks and rotatably and slideably mounted on the respective radial trunnions;
   each said cylindrical drive roller having a radial bore which is convexly shaped so as to permit nutational or wobbling movement of the drive rollers with respect to the radial trunnions responsive to orbiting of the spider center with respect to the first longitudinal axis during operation of the telescopic universal joint, and
   said radial trunnions having outer stops which are engaged by the drive rollers to limit outward movement of the drive rollers with respect to the radial trunnions during operation of the telescopic universal joint.

2. The tripot universal joint as defined in claim 1 wherein the outer stops comprise stop washers at the outer ends of the trunnions which have outer conical portions for limiting the outward movement of the drive rollers with respect to the radial trunnions.

3. The tripot universal joint as defined in claim 2 wherein the convexly shaped radial bore of each drive roller has a crown which is midway between the ends of the intermediate drive roller so that the radial bore flares toward each end of the drive roller.

4. The tripot universal joint as defined in claim 3 wherein the convexly shaped radial bore of each drive roller has a profile which is that of a radius which produces a drop of approximately 0.20 mm from the crown at each end of the radial bore.

5. The tripot universal joint as defined in claim 4 wherein a full complement of cylindrical needle rollers is disposed between the radial bore of each drive roller and the cylindrical bearing surface of its respective trunnion.

6. The tripot universal joint as defined in claim 5 wherein a sleeve is disposed between the radial bore of each drive roller and the full complement of cylindrical needle rollers and an inner stop washer is provided at the inner end of each drive roller.

7. A telescopic tripot universal joint comprising:
   a first drive member having a first longitudinal axis and three longitudinal drive channels equally spaced at substantial 120 degrees from each other, each longitudinal drive channel including two flat parallel drive tracks which are on opposite sides of the drive channel;
   a second drive member having a second longitudinal axis and three radial trunnions equally spaced at substantially 120 degrees from each other on coplanar radial axes which intersect the second longitudinal axis at a spider center, said radial trunnions having cylindrical bearing surfaces and being disposed in the respective longitudinal drive channels of the first drive member;
   three cylindrical drive rollers disposed in the respective longitudinal drive channels between the flat parallel drive tracks and rotatably and slideably mounted on the respective radial trunnions; and
   means to accommodate orbiting of the spider center around a joint center which is formed at the intersection of the first and second longitudinal axes when the telescopic universal joint is bent at an angle and rotated,
   said means including each said cylindrical drive roller having a radial bore which is convexly shaped so as to permit nutational or wobbling movement of the radial trunnions with respect to the cylindrical drive rollers in a plane defined by the coplanar radial axes of the radial trunnions during oribiting of the spider center, and
   said radial trunnions having outer stops which are engaged by the drive rollers to limit outward movement of the drive rollers with respect to the radial trunnions during operation of the telescopic universal joint.

8. The tripot universal joint as defined in claim 7 wherein the outer stops comprise stop washers at the outer ends of the trunnions which have outer conical portions for limiting the outward movement of the drive rollers with respect to the radial trunnions.

9. The tripot universal joint as defined in claim 7 wherein the convexly shaped radial bore of each drive roller has a crown which is midway between the ends of the intermediate drive roller so that the radial bore flares toward each end of the drive roller.

10. The tripot universal joint as defined in claim 7 wherein the convexly shaped radial bore of each drive roller has a profile which is that of a radius which produces a a drop of approximately 0.20 mm from the crown at each end of the radial bore.

11. The tripot universal joint as defined in claim 10 wherein a full complement of cylindrical needle rollers is disposed between the radial bore of each drive roller and the cylindrical bearing surface of its respective trunnion.

12. The tripot universal joint as defined in claim 11 wherein a sleeve is disposed between the radial bore of each drive roller and the full complement of cylindrical needle rollers and an inner stop washer is provided at the inner end of each drive roller.

13. The tripot universal joint as defined in claim 11 wherein the radial bore of each drive roller engages the full complement of cylindrical needle rollers disposed between the radial bore and the cylindrical bearing surface of its respective trunnion.

14. A telescopic universal joint comprising:
   a first drive member having a first longitudinal axis and three longitudinal drive channels equally spaced at substantially 120 degrees from each other, each longitudinal drive channel including two flat parallel drive tracks which are on opposite sides of the drive channel;
   a second drive member having a second longitudinal axis and three radial trunnions equally spaced at substantially 120 degrees from each other on coplanar radial axes which intersect the second longitudinal axis at a spider center, said radial trunnions having cylindrical bearing surfaces and being disposed in the respective longitudinal drive channels of the first drive member;

full complements of cylindrical needle rollers disposed on the cylindrical bearing surfaces of the radial trunnions; and three cylindrical drive rollers disposed in the respective longitudinal drive channels between the flat parallel drive tracks and rotatably and slideably mounted on the respective radial trunnions via the full complements of cylindrical needle rollers;

each said cylindrical drive roller having a radial bore which engages one of the full complements of needle rollers and which is convexly shaped so as to permit nutational or wobbling movement of the drive rollers with respect to the radial trunnions respective to orbiting of the spider center with respect to the first longitudinal axis during operation of the telescopic universal joint, and said radial trunnions having stop washers at their outer ends which are engaged by the drive rollers to limit outward movement of the drive rollers with respect to the radial trunnions during operation of the telescopic universal joint.

* * * * *